United States Patent
Doany

Patent Number: 5,471,143
Date of Patent: Nov. 28, 1995

[54] APPARATUS FOR LOCATING BURIED CONDUCTORS USING PHASE-SHIFTED SIGNALS

[75] Inventor: Ziyad H. Doany, Austin, Tex.

[73] Assignee: Minnesota Mining and Manufacturing Co.

[21] Appl. No.: 11,383

[22] Filed: Jan. 29, 1993

[51] Int. Cl.$^6$ .................................................. G01V 3/10
[52] U.S. Cl. ........................ 324/326; 324/67; 324/233; 324/243
[58] Field of Search ............ 324/67, 66, 207.15–207.18, 324/207.19, 233, 242, 243, 326, 32.9

[56] References Cited

U.S. PATENT DOCUMENTS

| | | | |
|---|---|---|---|
| 2,252,059 | 8/1941 | Barth | 175/182 |
| 2,921,179 | 1/1960 | Anderson | 219/125 |
| 3,617,865 | 11/1971 | Hakata | 324/3 |
| 3,729,675 | 4/1973 | Vosteen | 324/72 |
| 3,808,519 | 4/1974 | Lemercier et al. | 324/326 |
| 3,860,866 | 1/1975 | Dornberger | 324/52 |
| 3,889,179 | 6/1975 | Cutler | 324/3 |
| 3,988,663 | 10/1976 | Slough et al. | 324/3 |
| 4,091,322 | 5/1978 | Stankoff | 324/3 |
| 4,119,908 | 10/1978 | Cosman et al. | 324/3 |
| 4,134,061 | 1/1979 | Gudgel | 324/54 |
| 4,220,913 | 9/1980 | Howell et al. | 324/52 |
| 4,258,813 | 3/1981 | Rubel | 328/587 X |
| 4,295,095 | 10/1981 | Thomas et al. | 324/326 |
| 4,387,340 | 6/1983 | Peterman | 324/326 |
| 4,390,836 | 6/1983 | Bruce et al. | 324/54 |
| 4,427,942 | 1/1984 | Sole | 324/326 |
| 4,438,389 | 3/1984 | De Sa | 324/52 |
| 4,458,204 | 7/1984 | Weber | 324/326 |
| 4,520,317 | 5/1985 | Peterman | 324/326 |
| 4,542,344 | 9/1985 | Darilek et al. | 324/326 |
| 4,639,674 | 1/1987 | Rippingale | 324/67 |
| 4,665,369 | 5/1987 | Faller et al. | 324/326 |
| 4,672,321 | 6/1987 | Howell | 324/326 |
| 4,686,454 | 8/1987 | Pecukonis | 324/67 |
| 4,691,165 | 9/1987 | Szedlmajer | 324/326 |
| 4,767,237 | 8/1988 | Cosman et al. | 405/157 |
| 4,843,324 | 6/1989 | Humphreys, Jr. et al. | 324/326 |
| 4,942,365 | 7/1990 | Satterwhite | 328/134 |
| 4,990,852 | 2/1991 | Kirkland | 324/326 |
| 5,001,430 | 3/1991 | Peterman et al. | 324/326 |
| 5,093,622 | 3/1992 | Balkman | 324/326 |
| 5,119,028 | 6/1992 | Mooney et al. | 324/326 |
| 5,210,497 | 5/1993 | Regini | 324/521 |

Primary Examiner—Sandra L. O'Shea
Assistant Examiner—Jay M. Patidar
Attorney, Agent, or Firm—Gary L. Griswold; Walter N. Kirn; Jack V. Musgrove

[57] ABSTRACT

An apparatus for locating obscured conduits, such as buried cables, employs a novel signal processing technique to increase the sensitivity of the apparatus, particularly in congested areas. The cable locating apparatus is similar to prior art dual-peak detection devices which compare signals from two parallel induction coils, but a phase shift is introduced into one of the signals prior to the comparison. This phase shift serves to minimize the effects of side minima in the response curve of prior art dual-peak devices. This effect is enhanced by adding a gain mismatch to the two detected signals. The locator preferably operates with analog signals to reduce expense.

18 Claims, 5 Drawing Sheets

APPARATUS FOR LOCATING BURIED CONDUCTORS USING PHASE-SHIFTED SIGNALS

BACKGROUND OF THE INVENTION

1. Field of the Invention

The present invention generally relates to location of obscured conduits, and more particularly to a method of, and apparatus for, determining the location of an underground cable or pipeline which is capable of carrying an alternating electrical current.

2. Description of the Prior Art

It is often necessary to locate buried conduits, such as pipelines for gas, water and sewage, and cables for telephones, in order to repair or replace them if they are damaged or defective. It is also important to know beforehand the location of such underground utilities when excavating. The prior art includes many devices for locating conduits which have electrically conductive cables or are otherwise capable of carrying an electric current; these devices use induction coils or capacitive plates which sense electromagnetic test signals generated by the current in the conductor. The earliest cable locators use a single sensor which detects a single null or peak (depending upon the orientation of the sensor) as the unit passes near the cable. The peak is fairly broad, making it less precise in cable location. While null detection is sharper, it can be misleading where there are multiple cables carrying the test signal, so peak detection is better in such areas but since the response is still very broad, it can be very difficult to find the precise location of the peak.

Many later devices use two or more sensors that combine the signals to provide an indication of conductor proximity. Such sensing systems are described in the following patents:

| U. S. Pat. Nos. | |
| --- | --- |
| 3,617,865 | 4,542,344 |
| 4,091,322 | 4,639,674 |
| 4,134,061 | 4,665,369 |
| 4,220,913 | 4,672,321 |
| 4,295,095 | 4,686,454 |
| 4,387,340 | 4,843,324 |
| 4,390,836 | 4,942,365 |
| 4,427,942 | 4,990,852 |
| 4,438,389 | 5,001,430 |
| 4,458,204 | 5,093,622 |
| 4,520,317 | |

The last of these patents has a helpful comparison of techniques described in many of the other patents. It will also be appreciated that this latter patent is directed to improvements in signal processing, not in sensor arrangement.

The simplest multi-sensor apparatus is one in which the signals from only two sensors are combined, usually subtractively, to yield a single indication of proximity, as in the first of the above-listed patents. This technique (dual-peak), does not require the complicated circuitry of alternative designs, which is desirable for low-cost, sturdy cable locators. As further illustrated in FIG. 1, a graph of signal strength versus distance from the conductor, the dual-peak method also provides improved sensitivity in the area immediately adjacent to the buried conductor (i.e., a sharper response curve A compared to that B of a single peak detector). This method, however, exhibits false peaks or shoulders on either side of the primary peak, with sharp minima (nulls) between the maxima. This effect is undesirable for several reasons. First, an inexperienced user of the device might make a false reading if the cable is approached from beyond the false peaks. In the exemplary graph of FIG. 1, the cable might be mislocated at a horizontally displaced location two or three times the cable depth. The results might also be falsely read as detecting multiple conductors. Finally, the dual-peak method yields potentially confusing indications in congested areas where more than one conductor may be carrying the test signal.

One prior art device (the '942 patent) masks the side peaks by enabling the speaker only when the lower sensor detects more than a predetermined amount of signal strength than the upper coil detects. Although this method seems appealing, it is not optimum for two reasons. First, the side peaks have been masked, rather than eliminated or transformed into a flat response, which adds a non-linearity to the response and makes the readings particularly confusing and unpredictable in the presence of an adjacent conductor(s) carrying the signal in even small amounts; alternatively, it does not eliminate or reduce the interference from such adjacent cables. Secondly, it again requires additional hardware that increases the cost of the device. It would, therefore, be desirable and advantageous to devise a cable locator which retains the simplicity (and low manufacturing cost) of the dual-peak design, but minimizes the effects of false peaks.

SUMMARY OF THE INVENTION

The present invention provides an improved apparatus for determining the direction to and position of a current-carrying conductor. The apparatus generally comprises a receiver having two spatially oriented sensors, a signal processing unit, and an indicator. The sensors pick up a test signal induced by an alternating current in the conductor. The improvement lies in the introduction of a phase shift into one of the sensor signals prior to combining them. By offsetting the phase between the two sensors, the response is changed, such that the side minima and maxima are effectively eliminated. A gain mismatch between the two signals enhances the result, and makes the overall response much sharper. When used as an underground cable locator, the sensors may comprise induction coils which are supported in a receiver housing such that they are parallel and, during use, are generally horizontally aligned but are vertically separated. The improved response also facilitates location in areas where several cables are buried in close proximity.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 2:
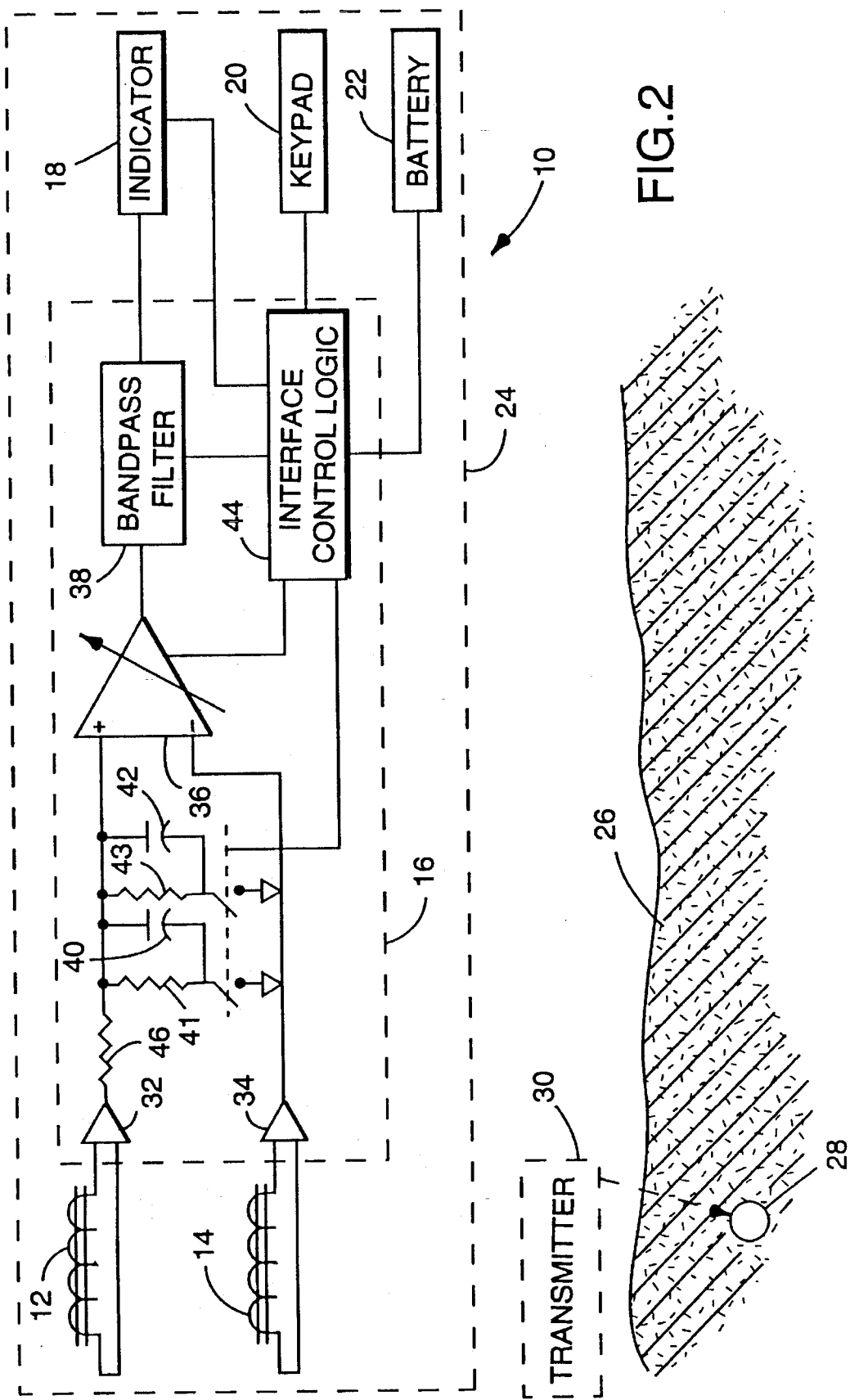
FIG. 2 is a schematic representation of the cable location system of the present invention, including the receiver apparatus.

With reference now to the figures, and in particular with reference to FIG. 2, there is depicted the cable locator embodiment 10 of the present invention. Locator 10 is generally comprised of a pair of spatially oriented sensors 12 and 14 connected to a signal processing unit 16, which is also connected to an indicator 18, keypad 20 and power source (battery) 22. All of these components may be located in a common housing 24, similar to that described in U.S. Pat. No. 5,093,622. Indicator 18 and keypad 20 may also take a form similar to the control panel of that patent, the indicator including a visual display and an audible speaker, and the keypad 20 including buttons for power on/off, frequency selection, signal calibration and depth readings. Sensors 12 and 14 are preferably magnetic-field induction coils, although it is conceivable that the present invention could also be modified for use with electric-field capacitive plates. The axes of the coils are generally parallel, and the sensors are preferably located in housing 24 such that, when the unit is held during use, the sensors are generally horizontal to the ground surface 26 and are vertically separated, defining sensor 12 as an upper sensor and sensor 14 as a lower sensor.

This use of the terms "horizontal" and "vertically" is accurate when describing the use of locating apparatus 10 to locate conductors which are underground, but they are not meant to be construed in a limiting sense. For example, if the conductor to be located were buried adjacent to an inclined retaining wall, or a cable was being traced in a building wall, the pitch of the housing would be adjusted normal to the surface of the wall.

Sensors 12 and 14 detect the electromagnetic signal generated by an alternating current in the conduit to be located, e.g., underground conductor 28. Current (at a known frequency such as 577 Hz or 33 kHz) may be placed on conductor 28 directly or inductively by a conventional transmitter unit 30. The received signals are amplified by preamplifiers 32 and 34 of signal processing unit 16. These amplified signals are then subtractively combined by variable gain amplifier 36, the output of which is passed through bandpass filter 38. The final conditioned output signal is sent to indicator 18.

The foregoing paragraph also describes typical prior art dual-peak detectors. The present invention departs from the prior art, however, by introducing a phase shift into the signal from either one of the sensors, prior to subtracting them. This step may be accomplished in several different ways, preferably by providing an RC circuit which includes a series resistor 46 and a capacitor 40 electrically connected to one of the inputs of amplifier 36. Additional RC circuits having different responses may be provided if locator 10 is to operate at more than one frequency, such as by switchably connecting a different capacitor 42 in place of capacitor 40. In this case, the RC circuits are selected by an interface control logic circuit 44, which is also connected to bandpass filter 38, to allow adjustment of the bandwidth to be passed. Logic circuit 44 controls switches connecting the RC circuits to ground (common or chassis). Alternatively, a variable resistor and/or variable capacitor in a single RC circuit may be used. For the multi-frequency embodiment of locator 10, filter 38 would of course be programmable. Control logic 44 also includes an automatic gain control to automatically adjust amplifier 36. A compander (a conventional compress/expand circuit—not shown) may also be used to provide finer sensitivity to changes in the received signal.

Figure 1:
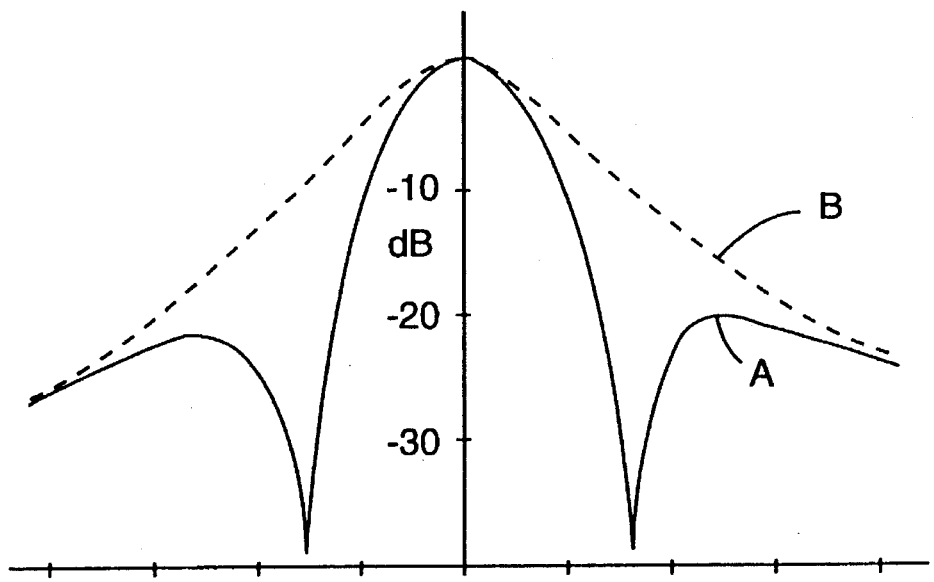
FIG. 1 is a graph illustrating the responses of typical prior art cable locators having single and dual sensors.
Figure 3:
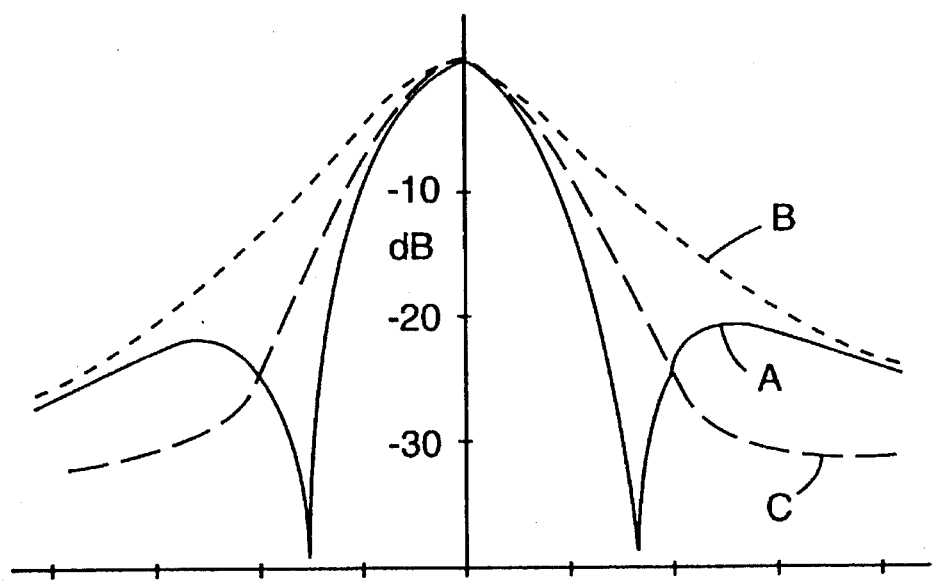
FIG. 3 is a graph comparing the response of the apparatus of the present invention with that of the prior art devices, when attempting to locate an isolated cable.

As a result of the relative phase shift between the signals, the minima normally found on either side of the primary peak in prior art dual-peak systems are practically eliminated. This is graphically demonstrated in FIG. 3, which depicts the response curve C of the locator of the present invention (curve C also reflects the gain mismatch explained further below); FIG. 3 also includes the prior art response curves A and B to facilitate comparison. This improvement arises as a consequence of the fact that the sum or difference of two alternating signals having a phase difference of something other than 0 or 180 degrees can never be equal to zero unless both signals are equal to zero. Therefore, the difference between the two (phase-shifted) signals from sensors 12 and 14 can never be zero, raising the minima on response curve C up. The phase shift may vary from 5 to 25 degrees, and is preferably about 12 degrees. Different phase shifts may be provided at different frequencies. For a locator 10 operating at the above-mentioned frequencies, the RC circuits have the following exemplary specifications: a 2 kΩ resistor 46 (assuming the values of resistors 41 and 43 given below), a 39 nanofarad capacitor 40 (for 577 Hz), and a 680 picofarad capacitor 42 (for 33 kHz).

The effect created by the phase shift between the signals may be enhanced by simultaneously increasing the relative gain of one of the signals, that is, by using such a gain mismatch in combination with a phase shift on the same pair of signals from the sensors. This is accomplished by connecting another resistor 41 in parallel with capacitor 40 (and by making similar connections in the alternate RC circuits, e.g., connecting a resistor 43 in parallel with capacitor 42). FIG. 2 illustrates the preferred mode of applying the phase shift and gain mismatch to upper sensor 12. Of course, the signal from sensor 14 could be modified instead, and it is further contemplated that the phase shift could be introduced in one signal, while the gain mismatch is applied to the other. If the signal from upper sensor 12 is to be modified, its gain should be decreased, but if the signal from lower sensor 14 is modified, its gain should be increased. It will be appreciated that other methods may be used to create the gain mismatch, such as by providing preamplifiers 32 and 34 with different characteristics.

While the phase shift raises up the side minima on curve C, the gain mismatch complements this result by flattening out the side peaks. By using the gain and phase mismatch, interference from adjacent conductors can be greatly diminished, as illustrated in FIGS. 4–8. The relative gain strength may vary between 1 to 4 dB, and is preferably about 2.4 dB, achieved by providing resistors 41 and 43 having a resistance of about 6.65 kΩ each. Those skilled in the art will appreciate that the optimum selection of the combination of phase shift degree and amount of gain mismatch depends upon several operating factors, most importantly the distance between the sensors and the likely depth of the cable. The foregoing preferred values reflect certain assumptions concerning operating parameters, as well as empirical study.

Figure 4:
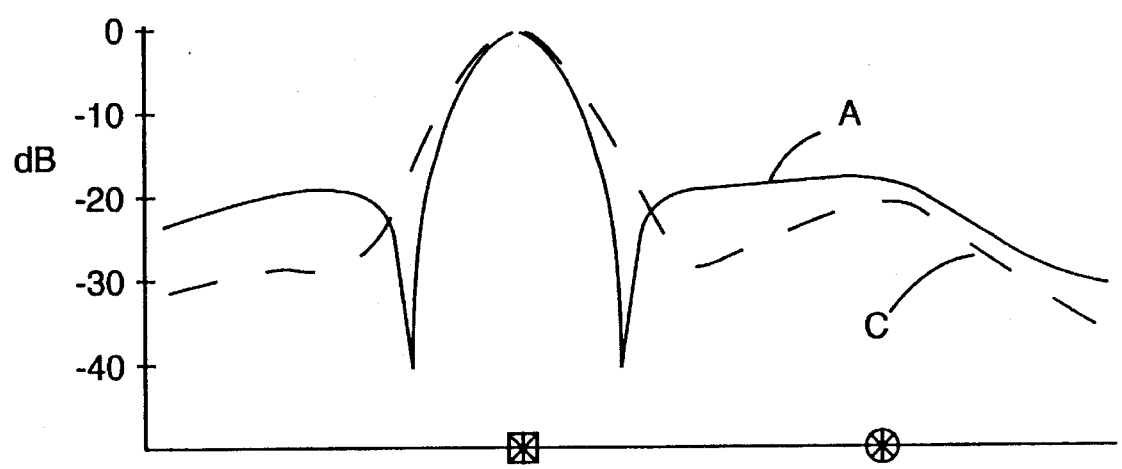
FIGS. 4–8 are graphs of theoretical response curves for prior art devices and the apparatus of the present invention, when attempting to locate a cable near a second conductor which is carrying a portion of the test current.
Figure 5:
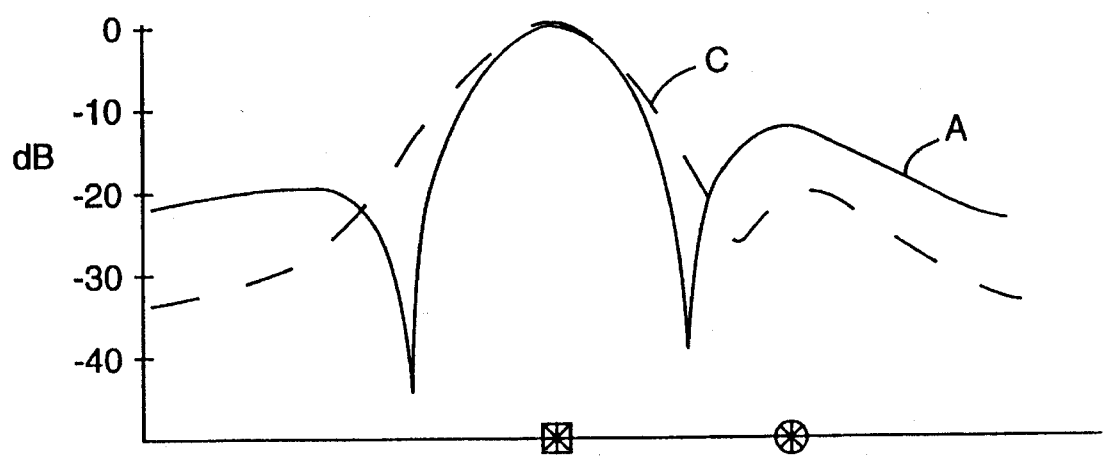
Figure 6:
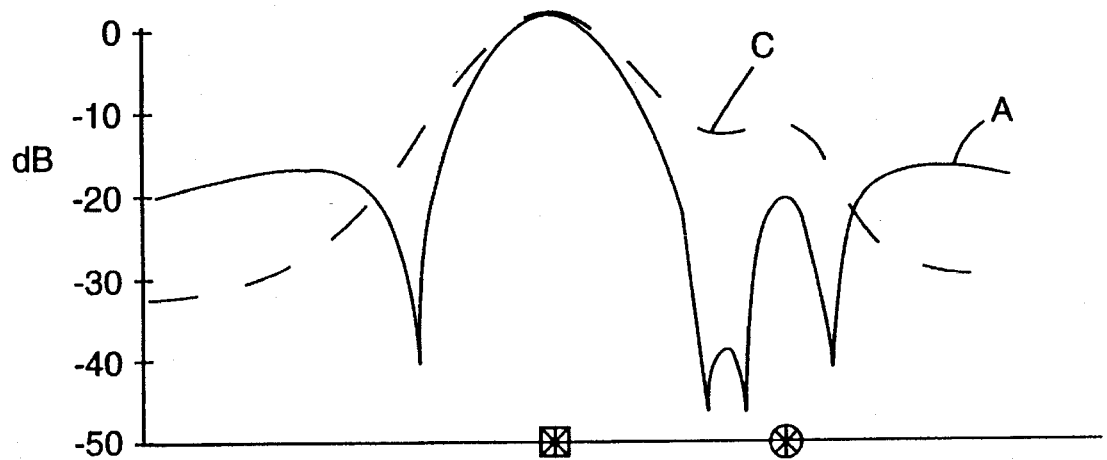
Figure 7:
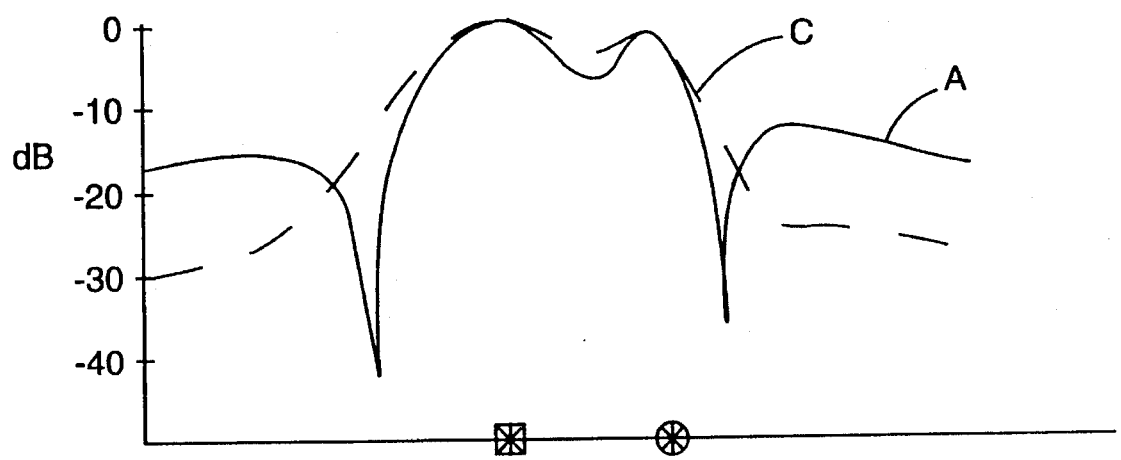
Figure 8:
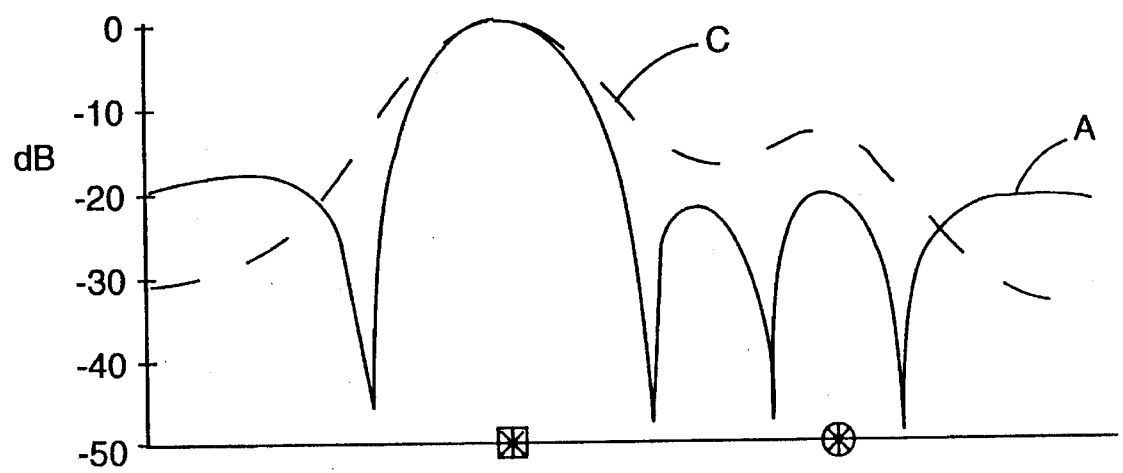

In each of the FIGS. 4–8, response curves A represent the theoretical responses for the prior art dual-peak method, while curves C represent the theoretical responses for the method of the present invention. The C curves were derived using a 12 degree phase shift and 2.4 dB attenuation. FIG. 4 depicts responses for a primary cable at a depth of 2 feet, and a secondary cable at a depth of 3 feet, displaced 9 feet to the right and carrying a current −1/10 that of the primary cable (the negative current value indicates that the flow of current in the secondary cable is in a direction opposite that of the primary cable, i.e., return current). In FIG. 5, the primary cable is at a depth of 3 feet, and the secondary cable is also at a depth of 3 feet, displaced 6 feet to the right and carrying a current −1/10 that of the primary cable. FIG. 6 illustrates responses for a primary cable at a depth of 3 feet, and a secondary cable at a depth of 2 feet, displaced 6 feet to the right and carrying a current 1/10 that of the primary cable. In FIG. 7, the primary cable is at a depth of 3 feet, and the secondary cable is at a depth of 1.5 feet, displaced 4 feet to the right and carrying a current 1/4 that of the primary cable. Finally, FIG. 8 shows responses for a primary cable at a depth of 3 feet, and a secondary cable at a depth of 2 feet, displaced 8 feet to the right and carrying a current 1/5 that of the primary cable.

Experimental data match the theoretical results in most cases, suppressing the minima and side peaks on the response curves. As can be seen from FIG. 4–8, when the side minima and side peaks are suppressed, the number of peaks in the response and their respective location correspond more accurately to the actual location of the buried conductors that are carrying the transmitter signal, thus eliminating confusion in most cases. In severely congested areas, where several adjacent cables carry the same test signal, the response of the phase-shifted dual-peak method as described herein may have some side peaks; however, their effective amplitude and number is nearly always lower than would be found with existing dual-peak devices.

Operation

Use of locator 10 is straightforward. Prior to use of the apparatus, however, transmitter 30 must be coupled to the conductor at some known, accessible location. This step is not necessary if the conduit already carries AC, for example, it is electrical power at a known frequency (60 Hz), assuming locator can operate at that frequency. The operator may begin locating at or near the transmitter, and follow the cable out. The unit is held by a handle which naturally orients the sensors in the proper position. The power on/off button is depressed, and may be followed by a battery threshold check (optional circuitry would indicate any low battery condition, by a visual icon or audible alarm). The operator may wish to select another button on keypad 20 to disable the speaker portion of indicator 18 and rely only on the visual display. If the locator is capable of detecting multiple frequencies, the appropriate frequency is selected through keypad 20. Another button may be used to reset the automatic gain control (this button may be repeatedly used throughout the locate process to keep the signal response with the higher sensitivity of the compander).

The operator may check the unit by swinging (translating) it back and forth across the conductor path very near the transmitter. As locator 10 is so moved, the output signal from signal processor 16 varies, becoming the strongest when the unit is closest to (directly over) the conductor. The unit is continually swung as the operator moves away from the transmitter, following the path as indicated by the greatest signal strength.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, it will be appreciated that the phase shift and gain mismatch achieved in the foregoing analog circuitry may also be accomplished using digital circuits, e.g., a programmable microprocessor, analog-to-digital converter, etc. While such alternative designs are within the scope of the present invention, they are deemed less preferable as they are more costly than the illustrated embodiment. It is therefore contemplated that such modifications can be made without departing from the spirit or scope of the present invention as defined in the appended claims.

I claim:

1. An apparatus for detecting a test signal radiating from an obscured conductor carrying an alternating current, comprising:

first means for sensing the test signal and creating a first electrical signal based thereon;

second means for sensing the test signal and creating a second electrical signal based thereon, said second sensing means being spatially displaced from said first sensing means, each of said first and second sensing means being parallel;

means for shifting the phase of said first electrical signal relative to said second electrical signal, resulting in a phase-shifted signal;

means for subtractively comparing said phase-shifted signal to said second electrical signal, yielding an electrical output signal; and means for providing an indication of the amplitude of said output signal.

2. The apparatus of claim 1 wherein said first and second sensing means comprise first and second induction coils each having an axis, and further comprising a housing, said first and second induction coils being attached to said housing and said axes being parallel.

3. The apparatus of claim 1 wherein:

said comparing means has an input electrically connected to said first sensing means; and said phase shifting means includes an RC circuit electrically connected to said input of said comparing means.

4. The apparatus of claim 1 further comprising means for increasing the amplitude of said first signal relative to the amplitude of said second signal.

5. The apparatus of claim 1 further comprising means for decreasing the amplitude of said first signal relative to the amplitude of said second signal.

6. The apparatus of claim 5 wherein said amplitude increase is within the range of 1 to 4 dB.

7. The apparatus of claim 1 wherein said first and second electrical signals, said phase-shifted signal and said output signals are all analog signals.

8. The apparatus of claim 1 comprising means for detecting test signals of at least two frequencies, wherein said phase shifting means provides a first relative phase shift between test signals from said first and second sensing means at a first of said two frequencies, and a second relative phase shift between test signals from said first and second sensing means at a second of said two frequencies, said first and second relative phase shifts being of different amounts.

9. The apparatus of claim 1 comprising means for detecting test signals of at least two frequencies, further comprising:

logic means for selecting one of said two frequencies; and keypad means for manually controlling said logic means.

10. The apparatus of claim 9 wherein:

said comparing means has an input electrically connected to said first sensing means; and said phase shifting means includes at least two RC circuits electrically connected to said input of said comparing means, each of said RC circuits including switch means for selectively connected said RC circuit to ground, said switch means being responsive to said logic means.

11. The apparatus of claim 10 further comprising means for changing the gain of said first electrical signal with respect to said second electrical signal.

12. The apparatus of claim 1 wherein said phase shift is within the range of 5 to 25 degrees.

13. An apparatus for detecting a test signal radiating from an obscured conductor carrying an alternating current, the apparatus including first means for sensing the test signal and creating a first electrical signal based thereon, second means for sensing the test signal and creating a second electrical signal based thereon, said second sensing means being spatially displaced from said first sensing means, means for subtractively comparing said first and second signals, yielding an electrical output signal, and means for providing an indication of the amplitude of said output signal, wherein the improvement comprises:

means for shifting the phase of said first electrical signal relative to said second electrical signal.

14. The apparatus of claim 13 wherein the improvement further comprises means for changing the relative gain of said first and second electrical signals.

15. The apparatus of claim 13 comprising means for detecting test signals of at least two frequencies, wherein said phase shifting means provides a first relative phase shift between test signals from said first and second sensing means at a first of said two frequencies, and a second relative phase shift between test signals from said first and second sensing means at a second of said two frequencies, said first and second relative phase shifts being of different amounts.

16. A system for locating a buried or otherwise obscured conduit carrying an alternating current, comprising transmitter means for sending an alternating current along said conduit at a known frequency, and receiver means for detecting the electromagnetic signal, said receiving means including:

a housing;

a first induction coil having an axis, attached to said housing;

a second induction coil having an axis, attached to said housing, said axes of said first and second coils being parallel;

a first preamplifier connected to said first induction coil, having an output connected in series with a resistor imparting a change in the gain of a signal received by said first coil relative to the gain of a signal received by said second coil;

a second preamplifier connected to said second induction coil, having an output;

a variable gain amplifier having a first input connected to said series resistor, a second input connected to said output of said second preamplifier, and an output;

a plurality of RC circuits each connected to said first input of said variable gain amplifier and each being switchably connected to ground, said RC circuits being tuned to shift the phase of signals at different frequencies, respectively;

programmable bandpass filter means for selectively passing a signal at said different frequencies, said bandpass filter having an input connected to said output of said variable gain amplifier, and having an output;

logic means for selecting one of said different frequencies;

keypad means for manually controlling said logic means; and means for providing an indication of the amplitude of an output signal at said output of said bandpass filter.

17. A method of determining the location of an obscured conduit carrying an alternating current, comprising the steps of applying an alternating current along said conduit at a known frequency, and detecting the relative strength of the electromagnetic signal radiated along the path of the conduit by:

obtaining first and second electrical signals, respectively, from first and second means for sensing the radiated electromagnetic signal;

shifting the phase of said first signal relative to said second signal;

subtractively comparing said first phase-shifted signal with said second signal, yielding an output signal; and examining the strength of the output signal.

18. The method of claim 17 further comprising the step of decreasing gain of said first signal relative to gain of said second signal, prior to said comparing step.

* * * * *